United States Patent [19]

Tisma

[11] Patent Number: 5,072,573
[45] Date of Patent: Dec. 17, 1991

[54] APPARATUS WITH ADJUSTABLE WIDTH TRAYS FOR AUTOMATIC PACKAGING MACHINES

[75] Inventor: Stevan Tisma, Chicago, Ill.

[73] Assignee: Tisma Machine Corporation, Chicago, Ill.

[21] Appl. No.: 508,269

[22] Filed: Apr. 11, 1990

Related U.S. Application Data

[63] Continuation-in-part of Ser. No. 464,162, Jan. 12, 1990.

[51] Int. Cl.[5] .......................... B65B 5/06; B65G 17/12
[52] U.S. Cl. ........................................ 53/252; 53/257; 53/261; 53/566; 198/803.9; 493/474
[58] Field of Search ................ 53/252, 251, 257, 261, 53/260, 566, 564; 493/474; 198/803.9, 803.11

[56] References Cited

U.S. PATENT DOCUMENTS

| | | | |
|---|---|---|---|
| 2,358,292 | 9/1944 | Malhoit | 198/803.11 |
| 2,651,443 | 9/1953 | Carter | 53/261 X |
| 3,608,701 | 9/1971 | Dieter | 53/251 X |
| 4,093,063 | 6/1978 | Calvert et al. | 198/803.9 X |
| 4,211,054 | 7/1980 | Sramek | 53/566 X |
| 4,716,714 | 1/1988 | Tisma | 53/251 X |
| 4,718,540 | 1/1988 | Greenwell | 198/803.11 X |
| 4,829,751 | 5/1989 | Tisma | 53/252 X |

FOREIGN PATENT DOCUMENTS 902568  6/1972  Canada .................................. 53/252

Primary Examiner—James F. Coan
Attorney, Agent, or Firm—Laff, Whitesel, Conte & Saret

[57] ABSTRACT

A tray-like mandrel for an automatic packaging machine has a telescoping bottom so that it may be made wide in order to receive a product or narrow in order to fit into a box. The telescoping is controlled by a slot track cam extending along a path followed by the mandrel. A cam follower riding in the slot track adjusts the tray width.

18 Claims, 12 Drawing Sheets

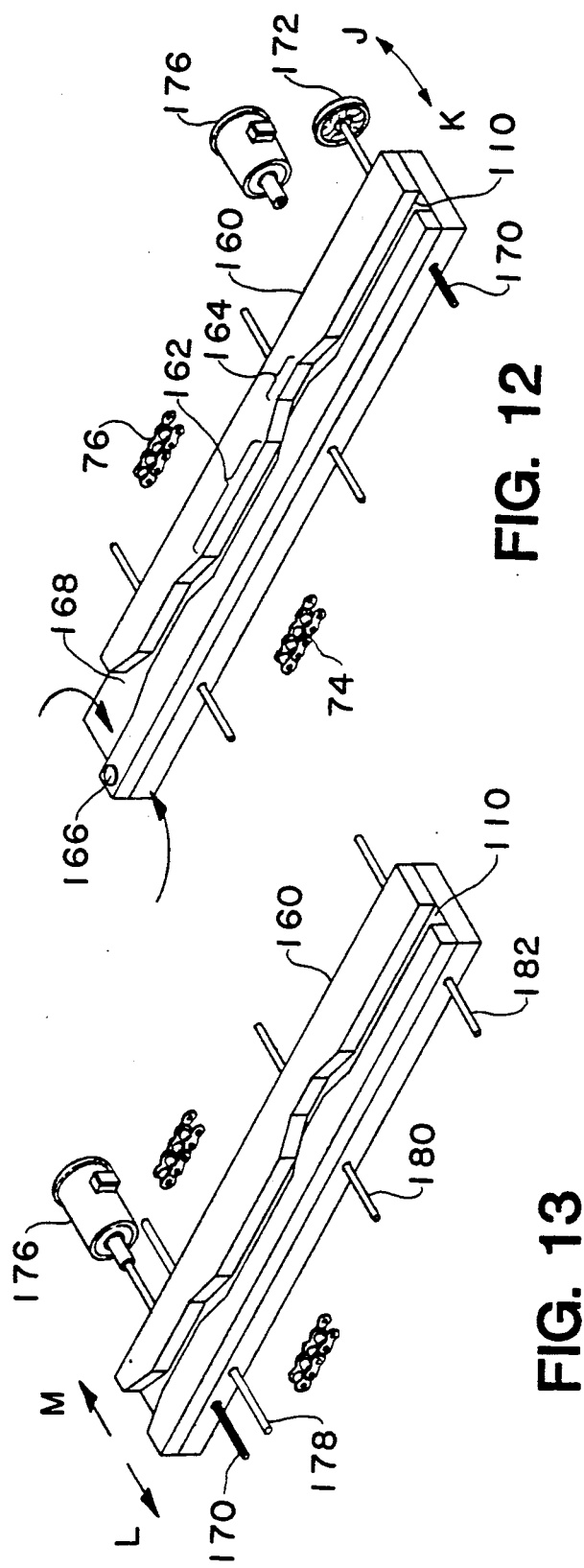

APPARATUS WITH ADJUSTABLE WIDTH TRAYS FOR AUTOMATIC PACKAGING MACHINES

This is a continuation-in-part of Ser. No. 07/464,162 filed on Jan. 12, 1990.

This invention relates to automatic packaging machines and more particularly to adjustable tray-like mandrels for such automatic machines.

Reference is made to U.S. Pat. No. 4,716,714, and 4,829,751 which show and describe prior art trays or mandrels of the type which are disclosed herein. The trays or mandrels shown in these patents are very well suited for loading some products. In particular, they carry the product down a conveyor to a point where the product is inserted into a box. If the product fits into the tray or mandrel, there are no problems. Exemplary of such a fit are solid somewhat box shaped products which are, perhaps an eighth or a quarter of an inch smaller than the inside dimensions of the boxes into which they fit.

However, there may be problems when the product does not have a precise shape or dimension. For example, a bag of potato chips may have almost any size and shape within relatively broad parameters. If such a bag is to be slid into a box, it first has to be formed into a somewhat rectangular cross section of a fairly uniform dimension. Another example of an irregularly shaped product is provided by a box of soda crackers. Usually, several rows of crackers are packaged or individually wrapped into separate paper or plastic tubes. Then, these tubes of crackers are positioned side by side in a box. The tubes of crackers have a variety of different cross-sectional dimensions so that they do not fit very neatly into a confined space. When these and similar products are dropped into the trays or mandrels shown in the above-identified patents, they do not always fit perfectly. This may cause a jam down the line.

The trays or mandrels of the above-described patents present still other problems. They require the user to change parts when different products are packaged. The change over costs production time, requires various adjustments, provides a small target area for loading, and sometimes causes an undue amount of controls and adjustments thereof.

Accordingly, an object of the invention is to provide new and improved trays or mandrels for automatic packaging machines. Here, an object is to accommodate products of irregular sizes and shapes. In this connection, an object is to provide for changing product and box configurations without having to replace any parts on the machine.

In keeping with an aspect of the invention, these and other objects are accomplished by providing trays or mandrels having an automatic width control. The trays are attached to conveyor chains which move past a loading area where the product is picked up and continues on carrying the product to a packaging area where it is put into boxes. In the loading area, the target provided by the tray may be made larger to facilitate a dropping of the product into it, i.e. an irregularly shaped product may be dropped into a tray which is much wider that the product is. As the tray is moved along the conveyor for product transfer, the tray width is reduced to shape the product in it so that the product fits into a box. If necessary, as it moves along the conveyor, the tray may be made larger or smaller several times and in different degrees in order to gently pat the product into the desired shape and size. Or it may be suddenly made smaller to whack the product into shape.

A preferred embodiment of the invention is shown in the attached drawings, in which:

FIG. 12 is a perspective view of a fragment of a slot track cam which is useful for adjusting the width of a mandrel tray;

FIG. 13 is an alternative of the embodiment of FIG. 12, wherein the width of the tray is automatically adjusted.

Figure 1:
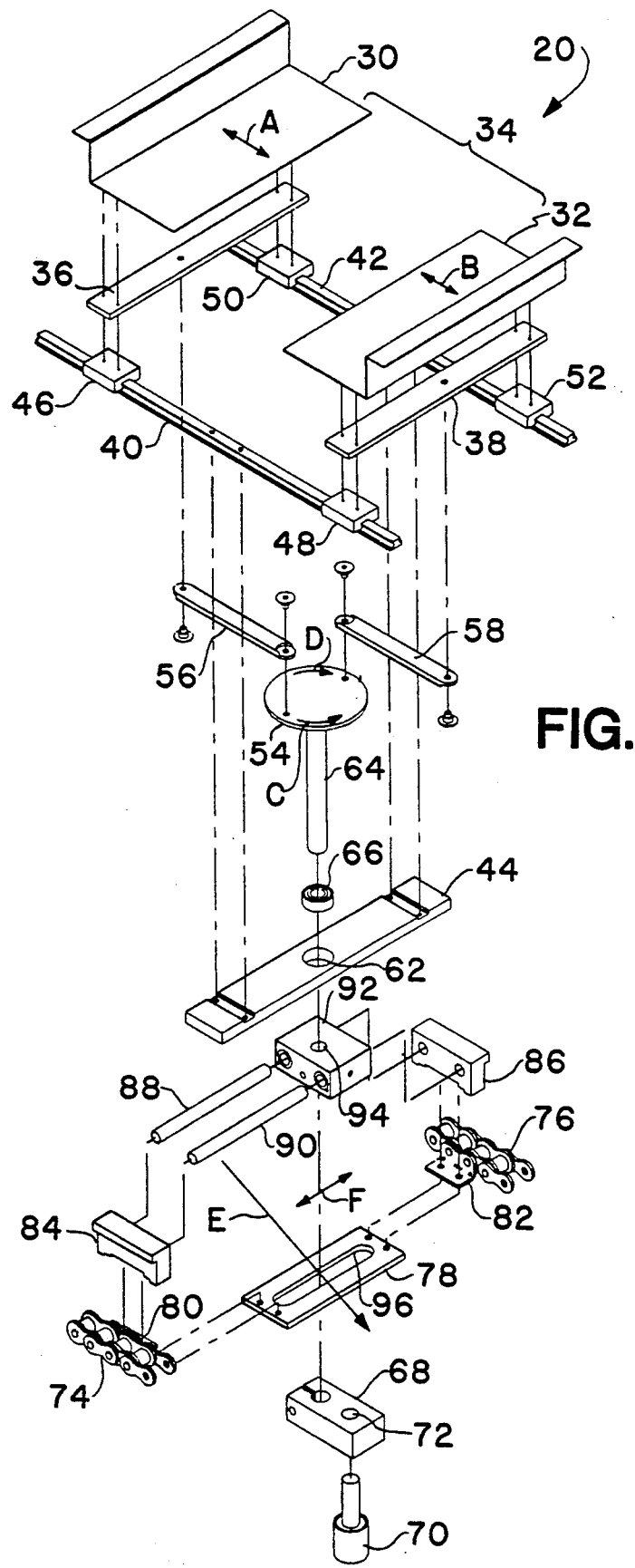
FIG. 1 is an exploded view of an inventive tray or mandrel.
Figure 2:
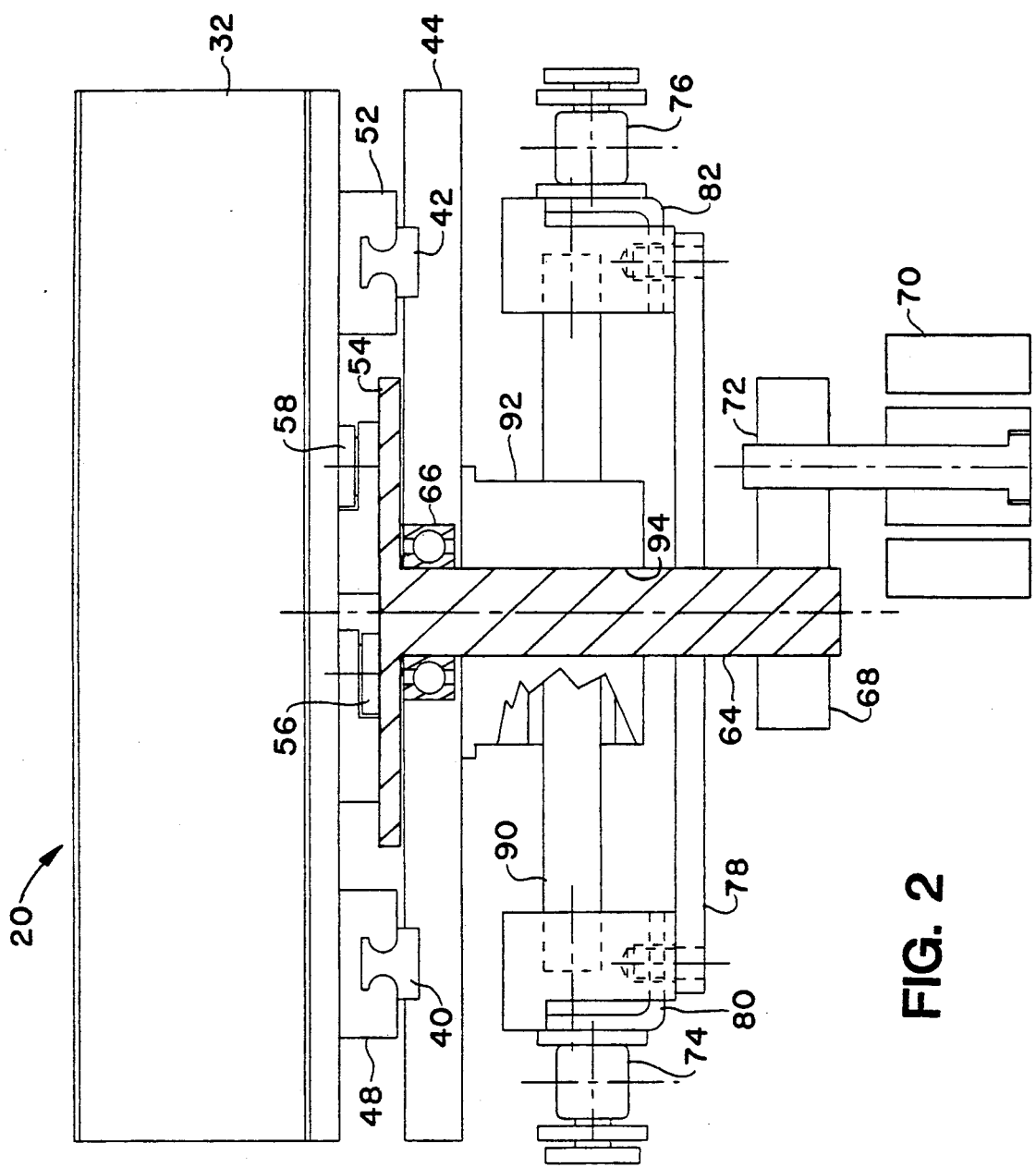
FIG. 2 illustrates a cross-section of the tray or mandrel of FIG. 1 after it is assembled.

FIG. 1 is an exploded view and FIG. 2 an assembled view of a preferred embodiment of the inventive tray. The mandrel tray 20 is comprised of two sheet metal side members 30, 32 (with a generally "L-shaped" cross-section) which slidingly fit over each other in the bottom region 34. These side members may slide toward and away from each other, as shown by the arrows A, B, in order to telescope together or apart. Bolted to the bottoms of side members 30, 32 are side bars 36, 38. These bars provide anchor points and, also, provide strength and rigidity to the trays. A pair of guide rails 40, 42 are held in a spaced parallel relationship by a support bar 44. Four nylon bearing blocks 46–52 are mounted to slide along the rails 40,42. The slide bars 36, 38 are mounted on the nylon bearing blocks 46–52 so that they may slide back and forth in directions A, B.

A rotary member 54 is mounted to rotate in a space which is always at the center of the tray, regardless of its width. Pivotally mounted on and extending between rotary member 54 and side bars 36, 38 are two lever arms 56, 58. When the rotary member 54 turns one way (Direction C), the sides 30, 32 of the tray are pulled in by lever arms 56, 58. When the rotary member 54 turns in an opposite direction (Direction D) the lever arms 56, 58 push out the sides 30, 32 of the tray.

The support bar 44, has a journal 62 into which an axle 64 and bearing 66 may fit in order to rotatably support the rotary member 54. Rotary member 54 is fixed to the upper end of axle 64. On the opposite or lower end of axle 50 is fixed a cam plate 68. The lower side of cam plate 68 has an upstanding member 15 which is a cam follower roller 70 having an axle that fits into a hole 72 in the bottom of cam plate 68. The ends of side bars 36, 38 are mounted on four nylon bearing blocks 46-52. Each block has "T" slots (FIG. 2) which fit over rails 40, 42. Therefore, as the cam follower 70 turns rotary member 54, the lever arms 56, 58 move, the tray side members 30, 32 slide back and forth on the rails 40, 42.

A pair of conveyor chains 74, 76 are, broadly speaking, about the same as conveyor 20 of U.S. Pat. No. 4,829,751. They carry the mandrel 20 formed by the tray 30, 32 along a predetermined path represented by arrow E (FIG. 1). A plate 78 extends between conveyor chains 74, 76 and is bolted thereto by brackets 80, 82. Also mounted on brackets 80, 82 are slide bars supports 84, 86. Spaced, parallel slide bars 88, 90 extend between supports 84, 86. A sliding member 92 slides back and forth (Directions F) on the bars 88, 90. The rotary member 54 has an axle 64 which fits through hole 94 in block 92 and slides within slot 96 in plate 78. Thus, the cam follower has continuous control over the rotary position of member 54 and, therefore, the width of the tray 30, 32 throughout the entire excursion (Directions F) over the slide bars 88, 90.

Figure 3:
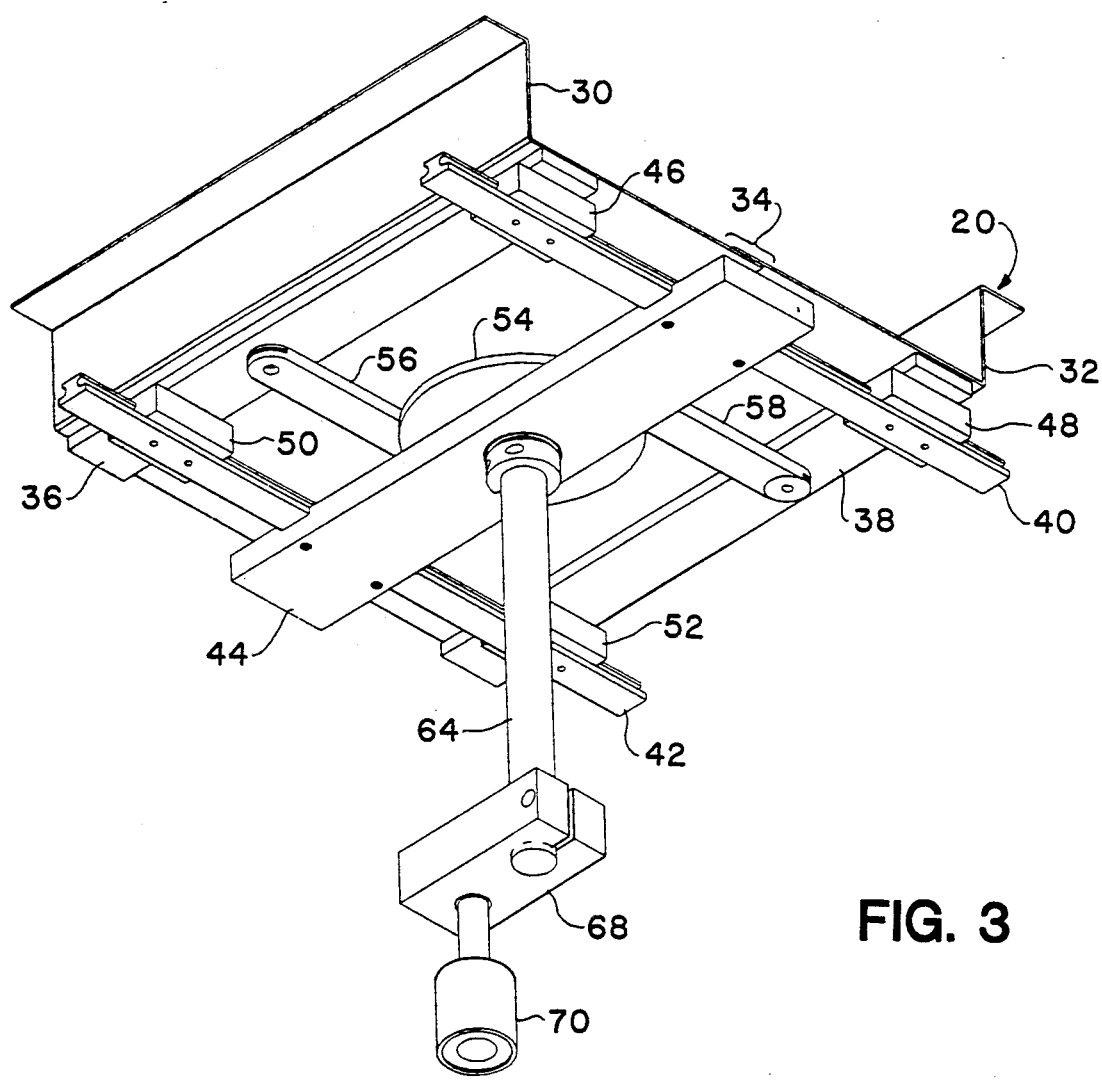
FIGS. 3 and 4 are perspective views which show how the inventive trays operate.
Figure 4:
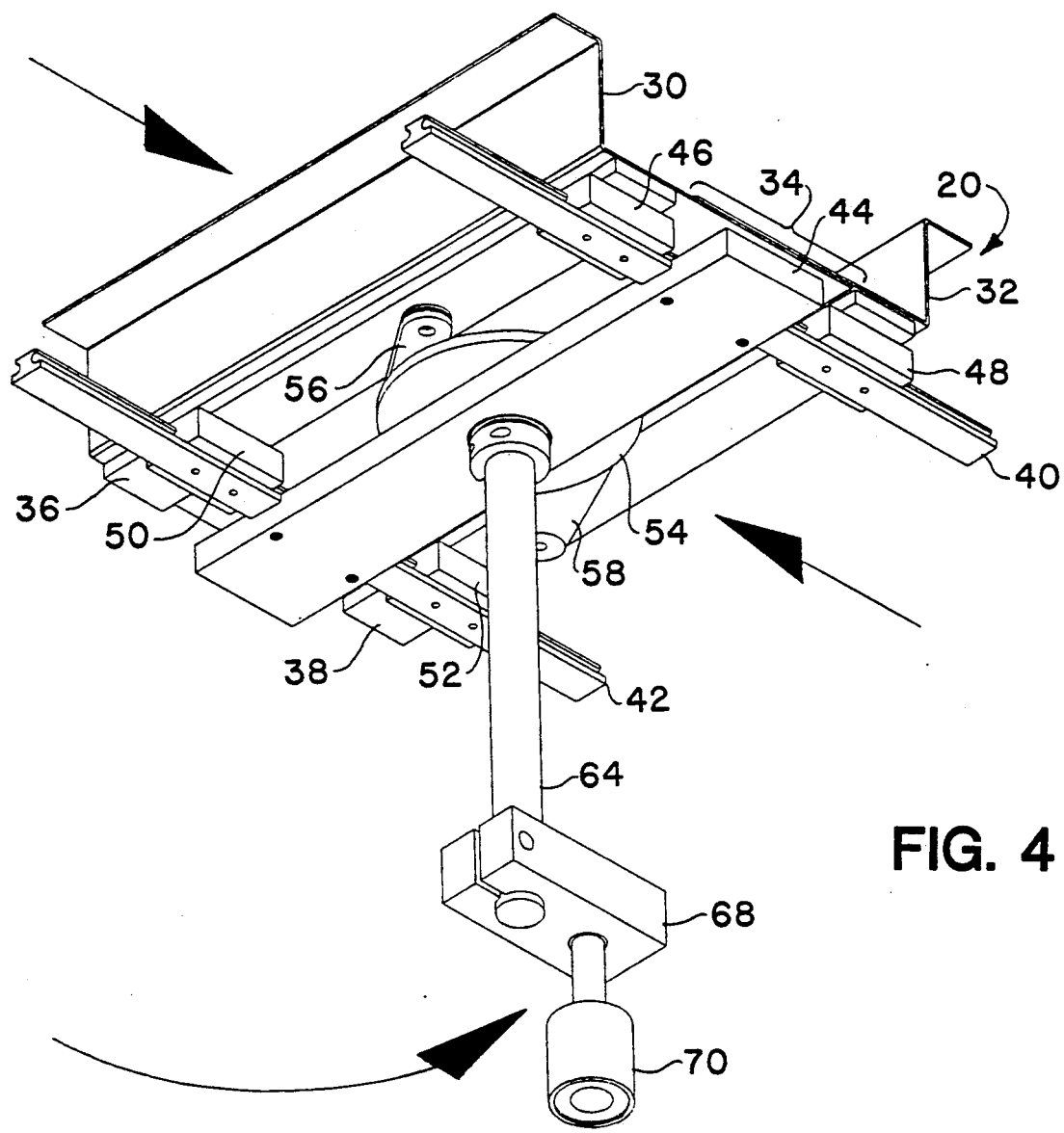

The operation of the tray or mandrel is clearly seen by comparing FIGS. 3 and 4. In FIG. 3, the cam follower 70 is in a position which might be described as "six-o-clock" (as viewed in FIG. 3) with respect to the support bar 44. In this position, the lever arms 56, 58 are extended. There is only a small overlap of tray bottoms at 34. The tray is relatively wide.

In FIG. 4, the cam follower 70 is moved 90° from the "six-o-clock" position of FIG. 3 to the "three-o-clock" position of FIG. 4. This movement rotates rotary member 54 through a 90° angle, pulling the lever arms 56, 58 in the process. The two sides 30, 32 slide together, moving on the guide rails 40, 42. There is a large overlap of tray bottoms at 34. The tray is relatively narrow.

Figure 5:
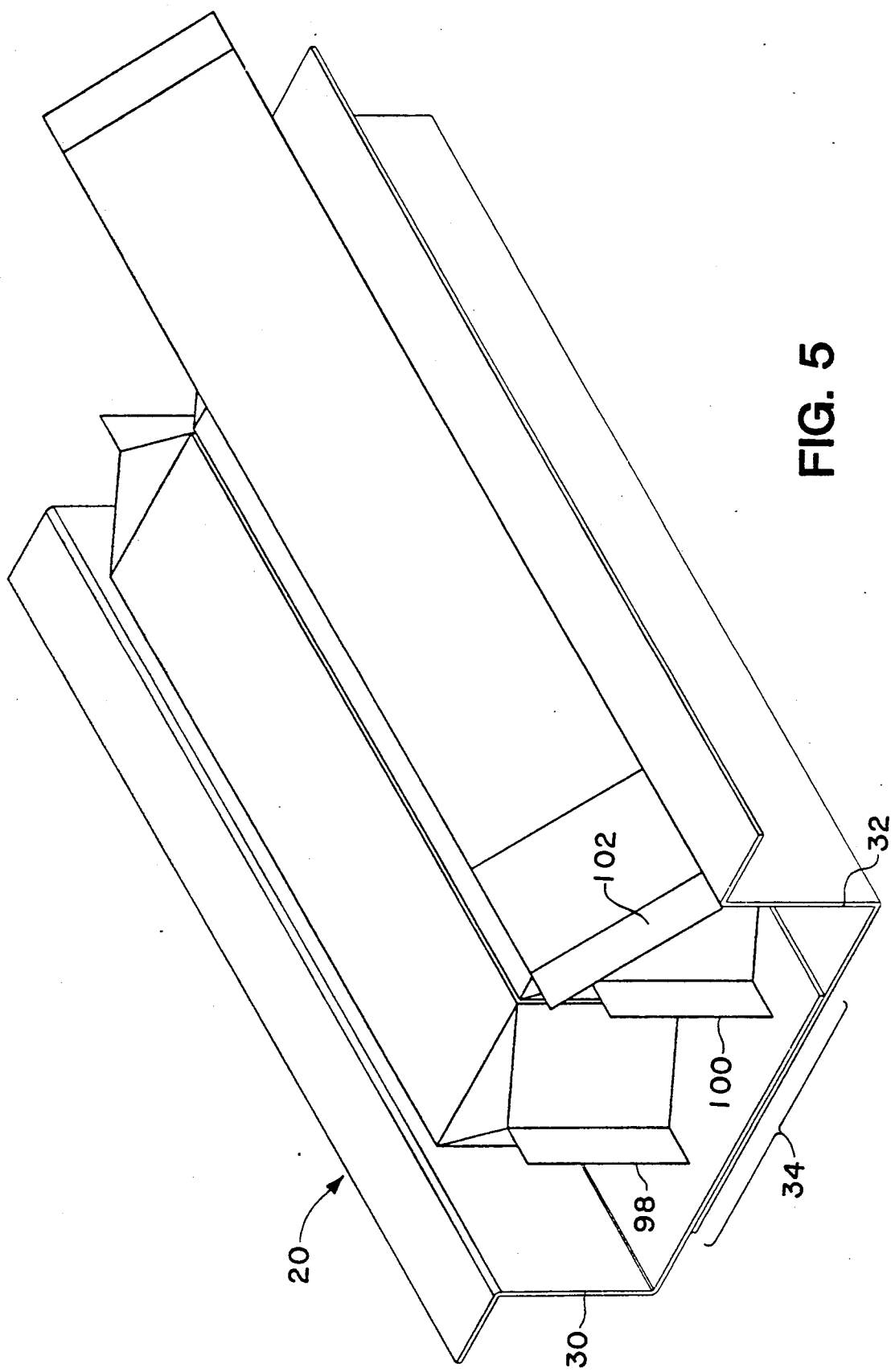
FIG. 5 shows how the irregular shape of a product may lead to jammed production lines.
Figure 6:
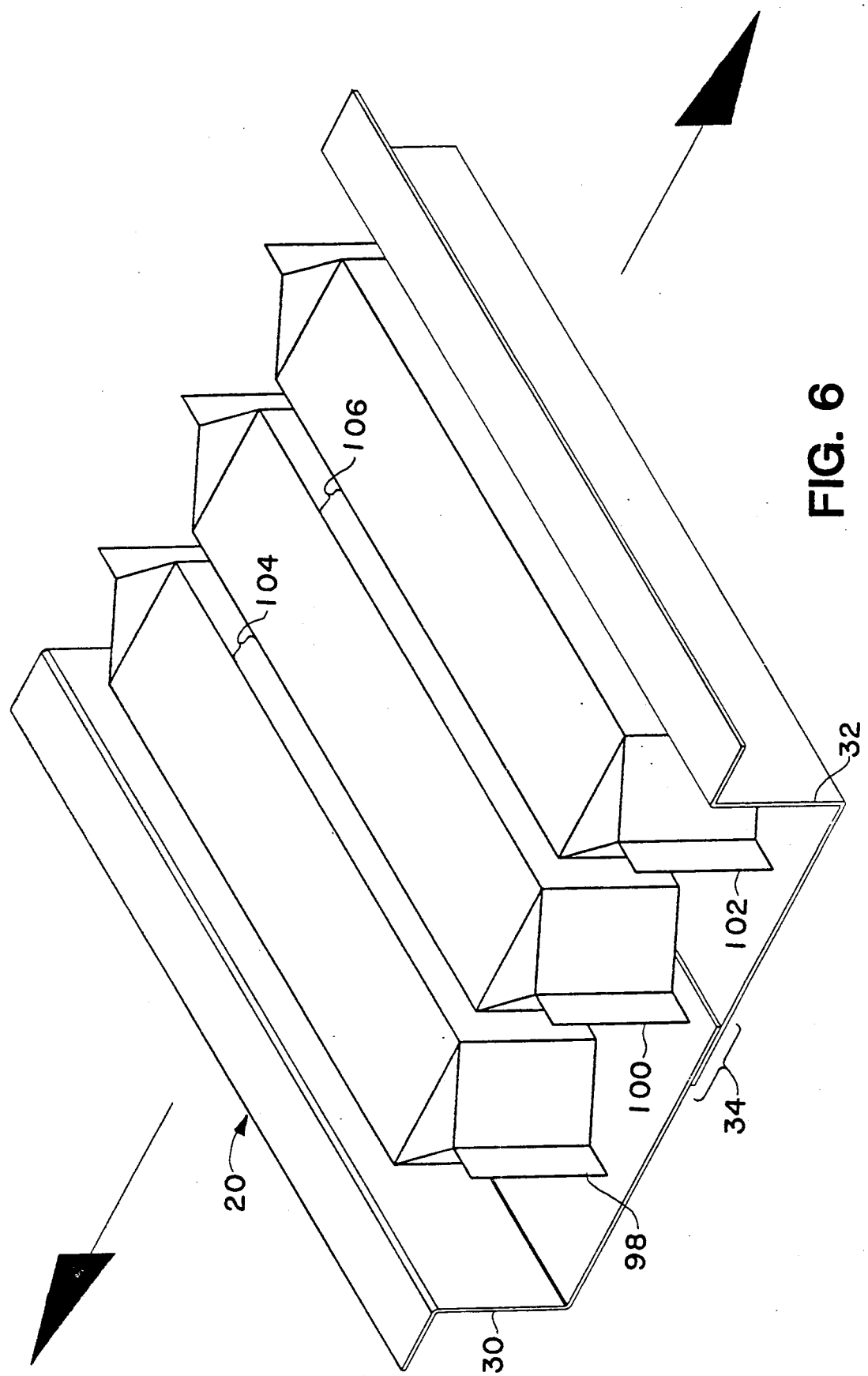
FIG. 6 illustrates how, with the invention, the irregularly shaped product of FIG. 5 may be accommodated by the invention.

FIGS. 5 and 6 illustrate one example of how and why the invention may be used to package irregularly shaped objects.

The product in the mandrel tray 20 includes three individually wrapped tubes 98, 100, 102 of soda crackers. Owing to the nature of the product, the three tubes do not have a closely controlled cross-section. The crackers may be misaligned so that each tube is, for example, an eighth of an inch wider than it should be, thus making an accumulated three-eighths of an inch of excess width. Also, depending upon where the misaligned crackers are located, there might be a much greater than normal width. The sides of the tubes may be rather irregular so that the same three tubes would not always fit together in the same way. This is shown in FIG. 5, where the tube of crackers 102 does not fit down and into tray 30, 32. Downstream, the out of position tube 102 may cause the system to jam.

It will be observed that, in FIG. 5, there is a substantial overlap of the mandrel tray bottoms 34, which means that the tray is narrow so that the three tubes 98, 100, 102 of crackers must fit almost perfectly if they are to rest in side by side positions. In FIG. 6, the tray 20 has been made much wider (note the small overlap at 34). Thus, there is enough space to receive the tubes 98-102 of crackers in a side by side relationship with a substantial space 104, 106 between them. As the tray moves from a loading position to a packaging position, the sides 30, 32 may move together to take up the space 104, 106 and make the tubes fit into a box as the tray 20 becomes more narrow.

Figure 7:
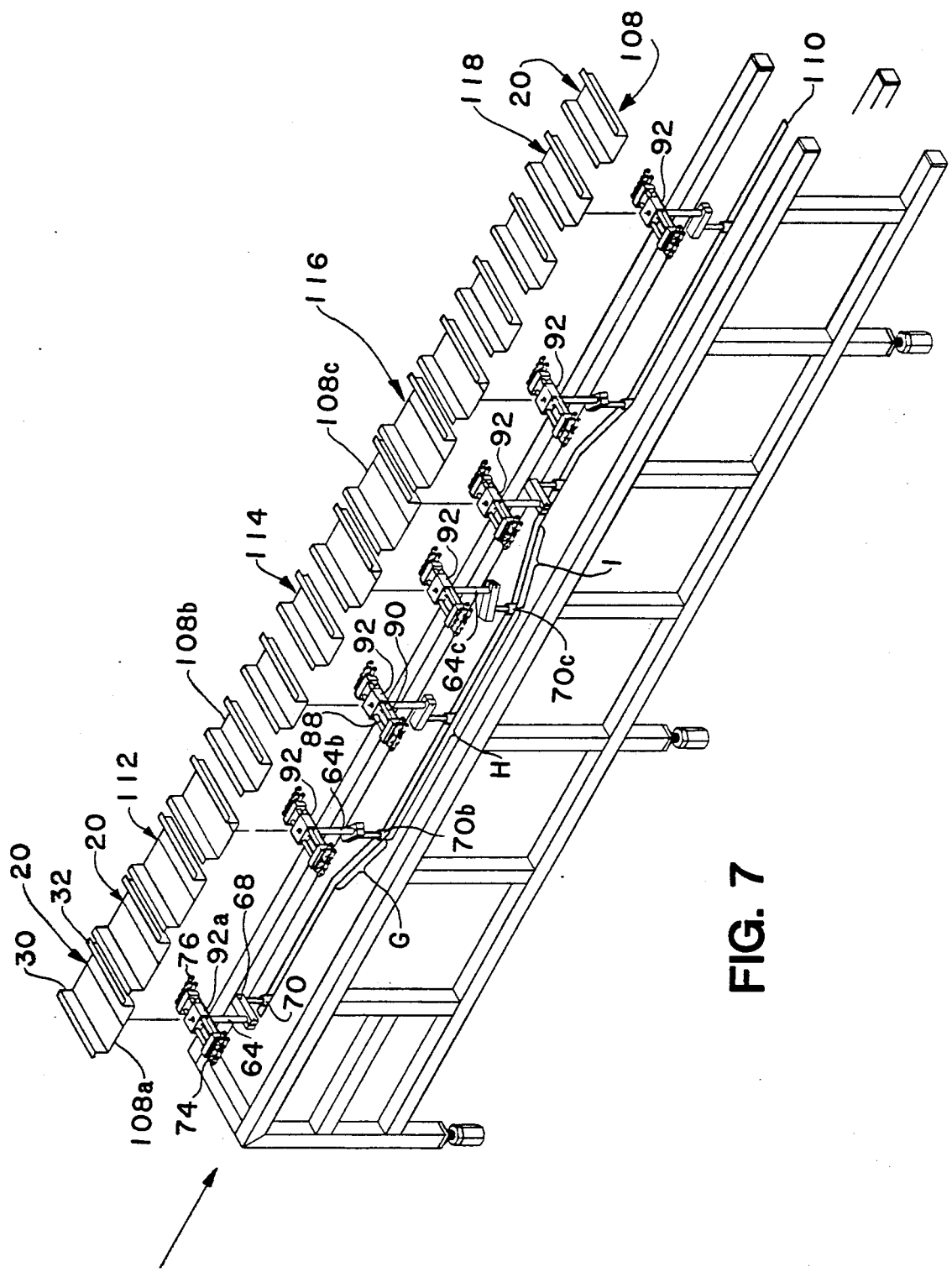
FIG. 7 is a perspective and exploded view which shows a part of a packaging machine which uses a cam track slot to control the width of the loading tray.

FIG. 7 is an exploded view which illustrates how the width 10 of the tray changes as a function of its position along its path of travel E. More particularly, the conveyor chains 74, 76 extend continuously along and on opposite sides of the path of travel E. Attached periodically to the chains 74, 76 are a plurality of the carriages seen in FIG. 1, a few of which are identified at 92, 92 . . . 92 in FIG. 7. To avoid a confusion caused by a clutter of parts, only a few of the carriages 92 have been drawn in FIG. 7. Each carriage 92 has a tray 20 individually associated there with. By way of example, tray 108a is here shown as being individually associated with carriage 92a.

Extending generally down the center of the conveyor is a cam track slot 110 in which each of the cam followers 70 rides. As the cam followers 70 move into one position G, the cam follower 70b rotates the axle 64b to one position in order to move the sides of the tray relatively close together to make a narrow tray 108b in area H. When the cam slot 110 moves the cam follower 70c to a new position at I, the axle 64c rotates to make the tray 108c relatively wider.

The angle at which the cam track slot 70 bends determines how violently or how gently the sides move together or apart. If the track moves back and forth with a small angular change of slot direction, the sides may gently pat the product into shape. Of course, a large angular change of slot direction could rather violently whack the product, if that is desired.

The principle is that the tray is made wider in the position 112 where the product is deposited in it. Then, as the tray approaches a location where the product is to be inserted into a box, the tray becomes more narrow shaping the product. At a loading position 114, the block 92 (FIG. 1) slides on rails 88, 90 to project the tray forward and thrust the product into the box. As the empty tray moves away from the loading position, it again becomes wider as it approaches another loading position.

In another use, the product may be loaded at position 112, squeezed at position 114, relaxed at position 116, and squeezed again at position 118, for loading. This way the product may be shaped by a repeated opening and closing of the tray to gently pat it into a desired form.

Figure 8:
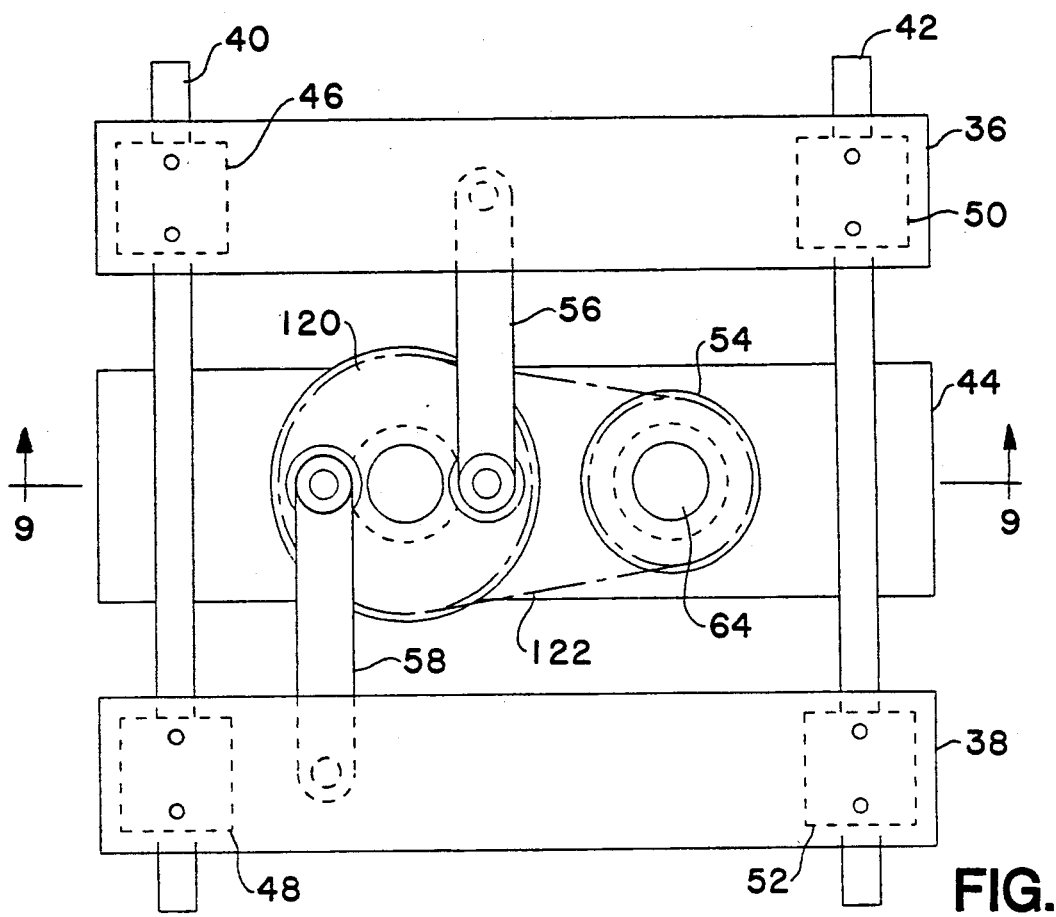
FIGS. 8 and 9 are a plan view and a cross section, respectively, which show a first alternative mechanism for adjusting the width of the tray.
Figure 9:
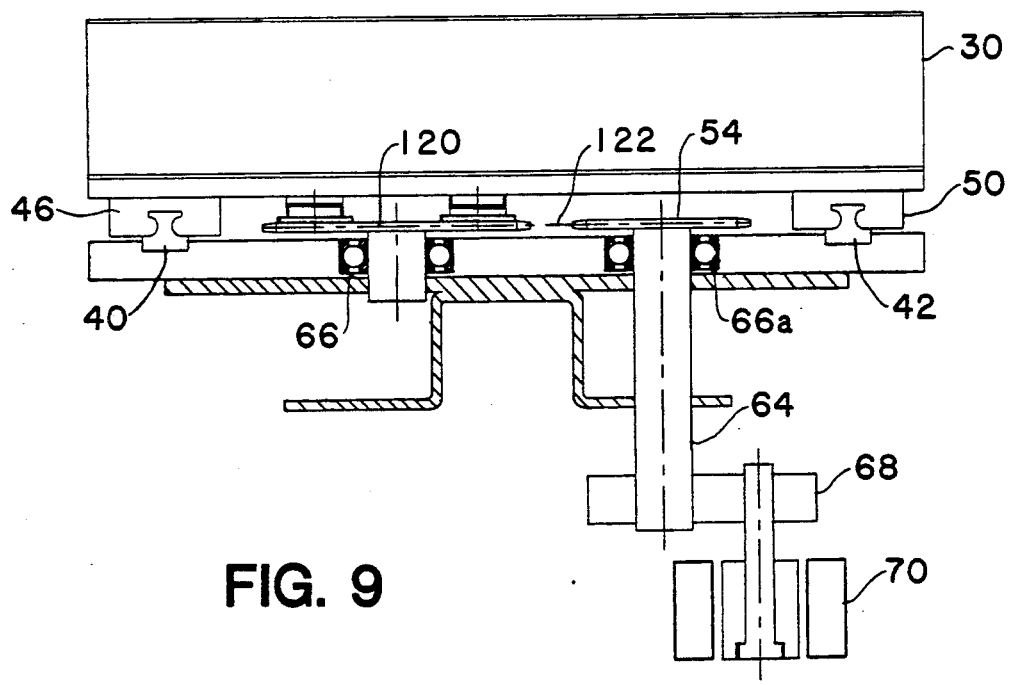

FIG. 8 and 9 are a bottom plan view and a cross section of a second embodiment of the invention. Here the lever arms 56, 58 are pivotedly connected to a turntable 120, which in turn is connected to the rotary number 54 by sprockets and link chain 122. When the cam slot rotates the axle 64, the rotary motion is transferred from rotary member 54 through the link chain 122 to the turntable. Otherwise, the operation is the same as that described above, in connection with FIGS. 1-6.

Figure 10:
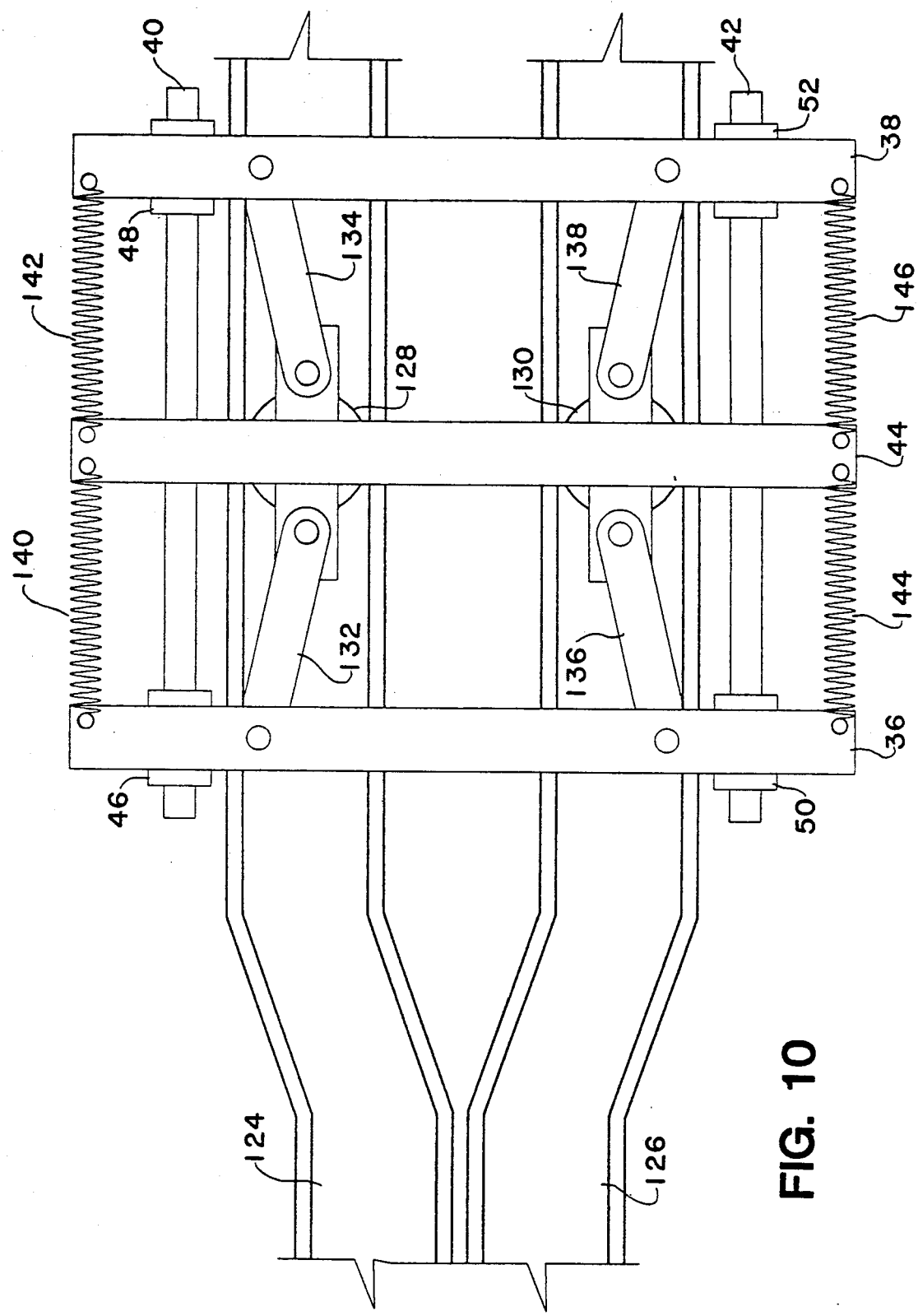
FIG. 10 is a plan view which shows a second alternative construction of an expandable tray bottom.

FIG. 10 shows another embodiment where the two sides 30, 32 (not shown but attached to side bars) are controlled independently of each other. There are two slot track cams 124, 126 which may diverge independently of each other. A separate cam follower roller 128, 130 (corresponding to follower 70) rides in each track 124, 126. Attached to and controlled by each cam follower are two lever arms 132, 134 and 136, 138. When the cam slots 124, 126 move together, the cam followers 128, 130 are pulled in, to pull together the side bars 36, 38 and, therefore to pull in tray halves 30, 32 to make the mandrel tray 20 more narrow. When the slot track cams move apart, the cam followers are pushed out to spread bars 36, 38 and, therefore, tray halves 30, 32. If only one of the cam slots 124, 126 changes direction, only one tray half moves. This kind of action may be especially useful when loading bags of gel, for example. The springs 140, 142 and 144, 146 provide a base which eliminates back lash and gives a more positive action.

Figure 11:
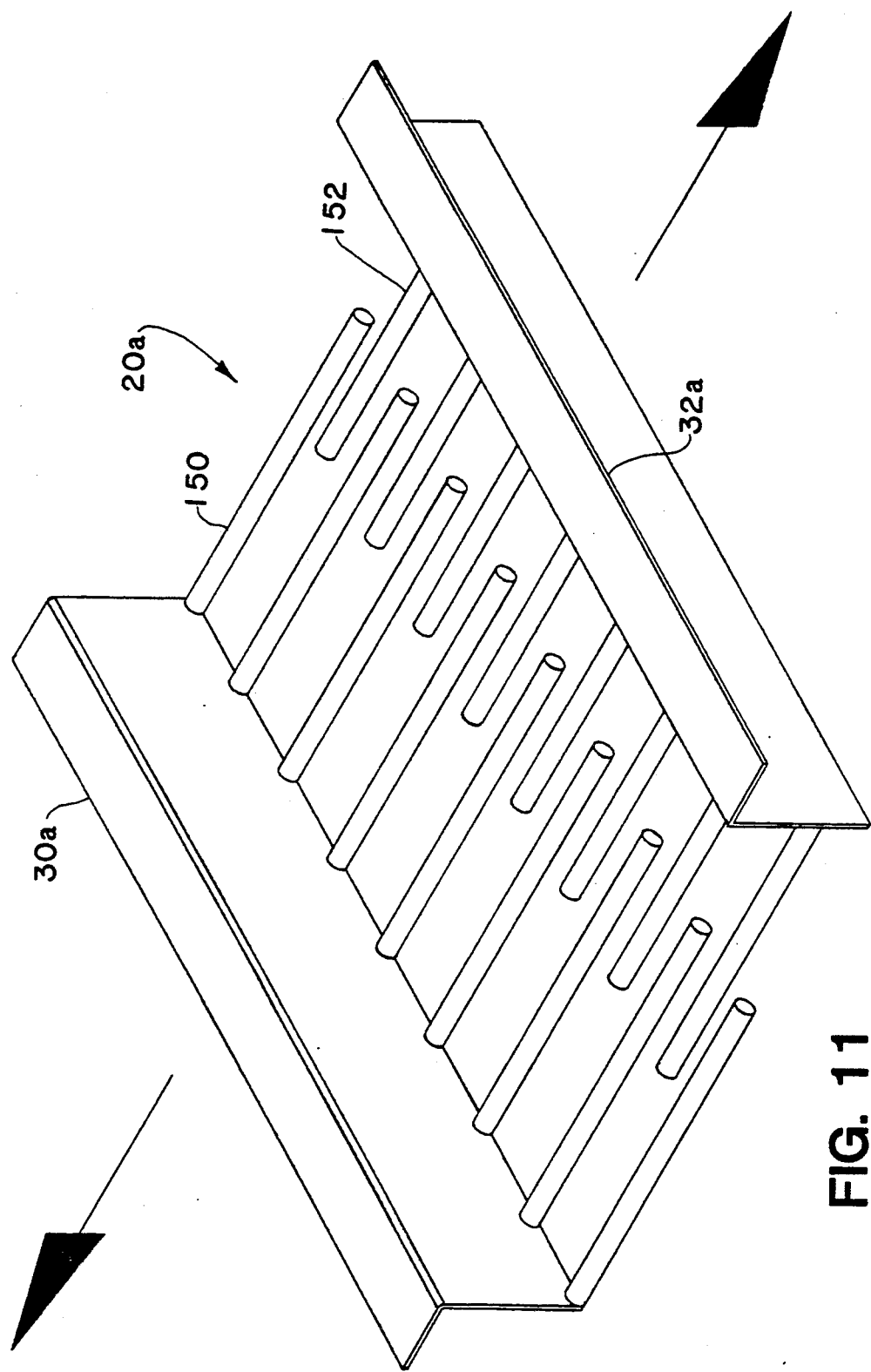
FIG. 11 is a plan view of an alternative mandrel tray with interdigitated fingers on the bottoms of the tray.

FIG. 11 shows an alternative construction for tray 20A. Here, instead of overlapping solid plates which telescope together, the bottom of the two sides 30a, 32a have interdigitating fingers such as 150, 152 which slide together and apart as the tray becomes wider or narrower. Otherwise, the embodiment of FIG. 11 is the same as that of FIG. 1.

Means (FIGS. 12, 13) are provided for automatically adjusting the widths of the mandrel trays while they travel so that it is not necessary to replace the mandrel trays each time that the box size is changed. In greater detail, FIG. 7 shows a slot track cam 110 which extends along the path E, which is followed by the mandrel trays. The slot track cam 110 extends down approximately the center of a space between the two conveyors chains 74, 76.

As shown in FIG. 12, any suitable, switchable profile of the slot track cam is formed in an elongated piece of metal 160. The cam follower roller 70 fits into and follows the slot 110. In one area 162 of the slot track, the follower 70 is positioned to make the mandrel tray wider. In another area 164 of the slot track, the follower 70 is positioned to make the tray narrower.

The actual width of the mandrel tray depends upon how far the follower 70 travels in the direction J. In general, the further the cam follower moves in direction J, the more narrow the tray will be. The usual width is to have the tray at its widest in the area 162 where it is loaded in order to provide a maximum target zone and a minimum need for an alignment between the target zone and the product.

Accordingly, at the loading position, there is no need for tray width adjustment because the need is to make the tray as wide as possible. Therefore, the metal plate 160 is pivoted at point 166, with the slot track part 162 oriented for maximum tray width. The track entrance 168 spreads outwardly to provide a somewhat funnel shape for guiding and directing the cam follower 70 into the slot track 110, regardless of the initial position of the follower.

The opposite end of the metal plate 160 is held at a position determined by a feed screw 170 which is turned by a hand wheel 172. As the hand wheel turns the feed screw 172, the unpivoted end of the metal plate 160 swings back and forth in directions J, K to adjust how far the cam follower roller 70 may or may not go in direction J white it travels through slot track section 164. Of course, the width of the tray depends upon the distance by which follower 70 moves as is explained by the comparison of FIGS. 3, 4.

The embodiment of FIG. 12 may be modified by replacing that the hand wheel 172 by a servo motor 176. With this arrangement, a person at a computer terminal only needs to enter any suitable notation, such as "six-inches" if that is the box size and the servo motor 176 responds by driving the feed screws 170 to properly position the metal plate 160 in a direction J or K, and therefore the slot track 110 is moved to control how far the follower 70 moves.

Thus, it is seen that when a box size is changed, it is only necessary to either turn hand wheel 172 or program servo motor 176 to reposition the cam slot 110. A suitable scale 174 may be provided to indicate the position of the cam slot 110, the scale indication preferably being set forth in terms of the tray width at the time of loading a product into a box. For example, if the tray needs to be exactly six inches wide to fit a particular part, hand wheel 172 is turned until the scale 174 reads "six-inches", or the like.

In FIG. 13, the principle is almost the same as the principle shown and explained in FIG. 12. This time, however, the metal plate 160 is mounted on guide rails 178, 180, 182 so that the entire plate 160 travels back and forth in directions L, M. The metal plate 160 does not pivot as it does in FIG. 12. A servo motor 176 drives a feed screw 170 to move the plate 160 and, therefore, slot track 110. Of course, a suitable hand wheel and scale may also be used in connection with the embodiment of FIG. 13.

In the embodiments described thus far, the mandrel tray is thrust forward toward the box at the loading position and then withdrawn from the box after loading. This is done so that the movement of the mandrel does not interfere with movement of the box and does not dislodge the product from the box. This mandrel movement results from a sliding of block 92 (FIG. 1) on slide base 88, 90. In some applications, and for a variety of reasons such as cost, accessibility for servicing, and the like, it may be desirable to use other means for thrusting the mandrel forward.

Therefore, in some instances, it may be desirable to completely eliminate the block 92 and the slide bars 88, 90, while retaining the function of thrusting the mandrels forward at the loading position. For this purpose, the automatic packaging machine of FIG. 14 may be adopted.

Figure 14:
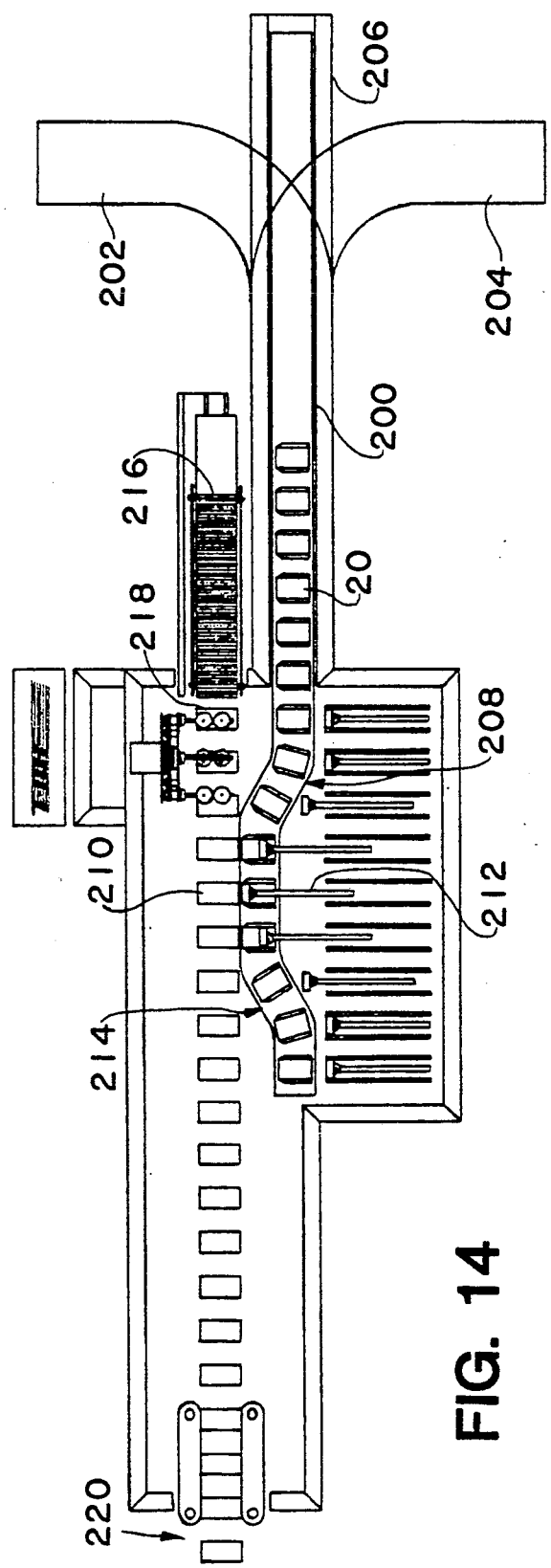
FIG. 14 is a plan view of an alternative embodiment of a packaging machine which may use the invention.

In FIG. 14, the chain-link conveyors 74 76 are replaced by self-aligning conveyors 200 which are standard commercial items available from Rex Nord, Inc. having an office at 305 Mount Lebanon Boulevard, Pittsburgh, P.a. 15234—Model RexSteel Side Flexing Chain 1874-K4 1/2. These conveyors are able to follow paths which may curve. Therefore, the drawing is prepared to show that the conveyor 200 input may be from either direction 202, 204, or straight on 206.

A magazine of folded cartons is shown at 216. Vacuum cups 218 pick up the folded cartons one at a time, and place them on a conveyor shaping them into boxes in the process. The output of the filled boxes is seen at 220.

At 208, the conveyor 200 approaches the product loading point. The conveyor moves the mandrel trays 20 and thrusts them into close proximity with the carton conveyor 210, thus eliminating the need for the block 92 and slide bars 88, 90. While the mandrel trays and cartons are aligned in such close proximity, a suitable pusher 212 pushes the product into the carton. After the product is so loaded, the conveyor 214 moves the mandrels away from their close encounter with the cartons. From there, the conveyor 200 circles back to the right side of the drawing. While the trays 20 move along the conveyor, an underlying slot, not shown but similar to slot 110, controls the follower 70 and, therefore, the width of the tray. The principles of FIGS. 12, 13 may be used to automatically adjust the tray width to accommodate the tray width to the box width.

Those who are skilled in the art will readily perceive how to modify the invention. Therefore, the appended claims are to be construed to cover all equivalent structures which fall within the true scope and spirit of the invention.

The claimed invention is:

1. A mandrel and assembly for an automatic package machine, said mandrel and assembly comprising at least one conveyor having a plurality of tray supports attached thereto and at periodic locations along the length thereof, means associated with said tray support for moving a tray between a loading position and a packaging position as said conveyor moves said tray supports along a predetermined path, a tray comprising two L-shaped side members which overlap in the center of said tray, whereby said tray telescopes between wide and narrow configurations, tray width control means for moving said side members between preselected positions to telescope said tray and change its width responsive to said conveyor movement along said predetermined path, two slots extending along said predetermined path, said tray width control means comprising two cam followers mounted on said tray to follow individually associated ones of said slots, means responsive to a movement of said cam followers for telescoping said tray whereby the width of said tray is adjusted by the position of said slot relative to said tray, each of said cam followers being mounted on the bottom of an individually associated rotary mounted vertical shaft, a pair of lever arms coupled to each of said rotary shafts and extending from said coupling to an associated one of said side members, means responsive to a movement of each of said cam followers for moving an individually associated one of said side members whereby said lever arms pull or push said side members responsive to a rotation of an associated one of said shafts, and the telescoped position of said side members are individually controlled by the contour of the slot in which its associated cam follower moves.

2. The tray-like mandrel of claim 1 wherein said each of said two L-shaped members forms a side and a half of the bottom of said tray, the bottom halves having a plurality of finger-like members which overlap in the center of said tray, the fingers of said two bottom halves interdigitating, whereby said trays telescopes between wide and narrow configurations in order to change width responsive to said movement along said predetermined path.

3. A mandrel and assembly for an automatic package machine, said mandrel and assembly comprising at least one conveyor having a plurality of tray supports attached thereto and at periodic locations along the length thereof, means associated with said tray support for moving a tray between a loading position and a packaging position as said conveyor moves said tray supports along a predetermined path, a tray comprising two L-shaped side members which overlap in the center of said tray, whereby said tray telescopes between wide and narrow configurations, and tray width control means for moving said side members between preselected positions to telescope said tray and change its width responsive to said conveyor movement along said predetermined path, said conveyor comprising a self-aligning conveyor chain, a plurality of said trays being mounted on said self-aligning conveyor chain, and means for causing said self-aligning conveyor chain to move said trays to positions remote from boxes in said loading position and adjacent said boxes in said packaging positions.

4. A tray-like mandrel for an automatic packaging machine, said automatic machine having a cam track extending along predetermined distance through said machine, said tray comprising a pair of side members each having a bottom plate which overlaps with the other tray bottom plate and which may move together or apart to make a narrower or a wider tray, cam follower means responsive to and controlled by said cam track for moving said side members to adjust the width of said tray in response to a profile of said cam track whereby a movement of said mandrel through said automatic packaging machine moves said pair of members together or apart as a function of the position of said tray on said cam track in order to adjust the width of said tray as a function of the position of said tray in said machine, means responsive to said movement of said members for conditioning a product to fit into a box of a predetermined size, and means for increasing or decreasing the width of said tray with a predetermined amount of force, whereby a product may be either gently patted or forcibly whacked into a predetermined size and shape.

5. The tray-like mandrel of claim 4 wherein each of said side members comprises an L-shaped member each forming a side and a half of the bottom of said tray, the overlapped members being a plurality of finger-like members, the fingers of said two bottom halves interdigitating, whereby said trays move interdigitally relative to each other as they telescope between wide and narrow configurations in order to change tray width responsive to said movement along said track.

6. A tray-like mandrel for an automatic packaging machine, said automatic machine having a cam track extending along predetermined distance through said machine, said tray comprising a pair of said members each having a bottom plate which overlaps with the other tray bottom plate and which may move together or apart to make a narrower or a wider tray, cam follower means responsive to and controlled by said cam track for moving said side members to adjust the width of said tray in response to a profile of said cam track whereby a movement of said mandrel through said automatic packaging machine moves said pair of members together or apart as a function of the position of said tray on said can track in order to adjust the width of said tray as a function of the position of said tray in said machine, means responsive to said movement of said members for conditioning a product to fit into a box of a predetermine size, said cam track being a slot in a metal plate, means for pivotly mounting one end of said metal plate, and means for adjusting the position of the other end of said metal plate in order to move said cam track thereby adjusting the position of said cam follower and the tray width thereby adjusting the tray to handle products of different sizes.

7. The tray-like mandrel of claim 6 wherein each of said side members comprises an L-shaped member each forming a side and a half of the bottom of said tray, the overlapped members being a plurality of finger-like members, the fingers of said two bottom halves interdigitating, whereby said trays move interdigitally relative to each other as they telescope between wide and narrow configurations in order to change tray width responsive to said movement along said track.

8. A tray-like mandrel for an automatic packaging machine, said automatic machine having a cam track extending along predetermined distance through said machine, said tray comprising a pair of side members each having a bottom plate which overlaps with the other tray bottom plate and which may move together or apart to make a narrower or a wider tray, cam follower means responsive to and controlled by said cam track for moving said side members to adjust the width of said tray in response to a profile of said cam track whereby a movement of said mandrel through said automatic packaging machine moves said pair of members together or apart as a function of the position of said tray on said cam track in order to adjust the width of said tray as a function of the position of said tray in said machine, means responsive to said movement of said members for conditioning a product to fit into a box of a predetermined size, said cam track being a slot in a plate, at least one guide rail for enabling said metal plate to move in a direction transverse to the slot, and means for adjusting the position of said plates on said guide rail thereby adjusting the position of said cam follower and the tray width.

9. The tray-like mandrel of claim 8 wherein said means for adjusting the position of said plates is a servo means for automatically moving said plate by a predetermined amount.

10. The tray-like mandrel of claim 8 wherein said means for adjusting the position of said plates is a hand controlled means for controlling the amount of said transverse movement.

11. A tray-like mandrel for an automatic packaging machine, said automatic machine having a cam track extending along predetermined distance through said machine, said tray comprising a pair of side members each having a bottom plate which overlaps with the other tray bottom plate and which may move together or apart to make a narrower or a wider tray, cam follower means responsive to and controlled by said cam track for moving said side members to adjust the width of said tray in response to a profile of said cam track whereby a movement of said mandrel through said automatic packaging machine moves said pair of members together or apart as a function of the position of said tray on said cam track in order to adjust the width of said tray as a function of the position of said tray in said machine, means responsive to said movement of said members for conditioning a product to fit into a box of a predetermined size, and means for changing the position of said cam track in order to alter the amount of the automatically varied width of said tray as said function of said tray position thereby adjusting the tray to handle products of different sizes.

12. A mandrel tray for an automatic packaging machine comprising a pair of confronting side members mounted to move toward and away from each other, a rotary member coupled to said side members for moving them either together or apart responsive to a rotational movement of said rotary member, a cam, cam follower coupled to impart said rotational movement to said rotary member responsive to a movement of said mandrel tray along a predetermined path, said cam being a slot extending along said path, said slot having a profile which imparts said desired rotational movement to said rotary member in response to a movement of said follower along said slot, at least one conveyor chain extending along said slot for conveying said mandrel tray, and means for adjusting the position of said slot relative to said conveyor chains.

13. The tray of claim 12 and means for thrusting said tray in said transverse movement at a location where said slot causes said tray to become narrower.

14. The tray of claim 13 wherein said thrusting means comprises a pair of slide rails having a block slidably mounted thereon, said rotary member being carried by said block mounted on said side rails.

15. The tray of claim 13 wherein said conveyor chain is a self-aligning chain which is able to follow a curving path and said means for thrusting said tray is a curve in said path which moves said tray in aid transverse movement toward a loading position at a location said slot causes said tray to become narrow.

16. The mandrel of claim 12 wherein each of said side members comprise an L-shaped member, each L-shaped member forming a side and a half of the bottom of said tray, the bottom halves overlapping in the center of said tray, each of the overlapped bottom halves having a plurality of finger-like members, the fingers of said two bottom halves interdigitating, whereby the bottoms of said tray telescopes interdigitally between wide and narrow configurations in order to change its width responsive to said movement along said track.

17. A mandrel for loading boxes, said mandrel being telescopic so that it may be made wider to provide a wide target in a loading area and be made narrower to fit into a box in a loading area, and a cam track extending along a path followed by said mandrel for making said tray wider or narrower as a function of the position of said mandrel on said path, said cam track having a profile which gently pats a product in said mandrel into a shape and size which fits into a box.

18. A mandrel for loading boxes, said mandrel being telescopic so that it may be made wider to provide a wide target in a loading area and be made narrower to fit into a box in a loading area, and a cam track extending along a path followed by said mandrel for making said tray wider or narrower as a function of the position of said mandrel on said path, said cam track having a profile which whacks said product in said mandrel to force it into a shape and size which fits into a box.

* * * * *